United States Patent [19]

Rodgers

[11] 4,371,784
[45] Feb. 1, 1983

[54] THIN FILM PLANE-POLARIZED INTENSITY PICKOFF

[75] Inventor: Aubrey Rodgers, Huntsville, Ala.

[73] Assignee: The United States of America as represented by the Secretary of the Army, Washington, D.C.

[21] Appl. No.: 202,261

[22] Filed: Oct. 30, 1980

[51] Int. Cl.³ .................. G01C 19/28; G02B 5/30; G02B 27/28
[52] U.S. Cl. .................. 250/231 GY; 74/5.6 A; 350/396; 350/407
[58] Field of Search .................. 356/364-365, 356/370; 350/396, 407; 250/225, 231 SE, 231 GY; 74/5.6 A; 73/504

[56] References Cited

U.S. PATENT DOCUMENTS 3,224,281 12/1965 Blazek .................. 74/5.6 A

FOREIGN PATENT DOCUMENTS 875048 9/1942 France .................. 350/396
1213868 11/1970 United Kingdom .................. 73/504

OTHER PUBLICATIONS

Zoller et al., "Angular Displacement Transducer for Use in a Torsion Pendulum" Rev. of Sci. Instruments 6/75, pp. 695-696.
Shurcliff, W. A. "Polarized Light" Harvard U. Press, 1962 pp. 104-107.
Bennett et al., "Polarization" section 10 of Handbook of Optics, editor Driscoll et al., McGraw Hill 1978, pp. 10-147-148.

Primary Examiner—William H. Punter
Attorney, Agent, or Firm—Nathan Edelberg; Robert P. Gibson; Harold W. Hilton

[57] ABSTRACT

This invention disclosure describes a thin film plane-polarized electro magnetic energy pickoff system. The system provides a wide-angle linear range of ±40 degrees with a cosine nonlinear range of ±65 degrees. The design allows all active components to be mounted on the unstabilized housing structure, thus eliminating torque stabilization problems.

3 Claims, 5 Drawing Figures

THIN FILM PLANE-POLARIZED INTENSITY PICKOFF

DEDICATORY CLAUSE

The invention described herein may be manufactured, used, and licensed by or for the Government for governmental purposes without the payment to us of any royalties thereon.

BACKGROUND OF THE INVENTION

The thin film plane-polarized intensity pickoff of the present invention differs from known concepts in that it uses a stabilized plane of polarized electromagnetic energy to measure angular position about a stabilized axis. Previously known wide-angle pickoffs used unpolarized electromagnetic energy as optical devices and other pickoff designs used either capacitance or magnetic field types. Apparatus of the present invention can be used as a wide-angle gimbal position pickoff for stabilized instruments or it can be used to measure angular position of unstabilized systems. The advantage over prior pickoff concepts, is that it eliminates gimbal wiring/slip ring torques.

SUMMARY OF THE INVENTION

A gimbal assembly including an outer stabilized gimbal and an inner gimbal. A fiber optic bundle is carried on the stabilized gimbal and enters and exits the stabilized gimbal through the shafts supporting the stabilized gimbal to a frame. An unpolarized energy source transmits unpolarized energy through the fiber optic path and through a polarizer to an analyzer and then to a detector.

DESCRIPTION OF THE PREFERRED EMBODIMENT

Figure 1:
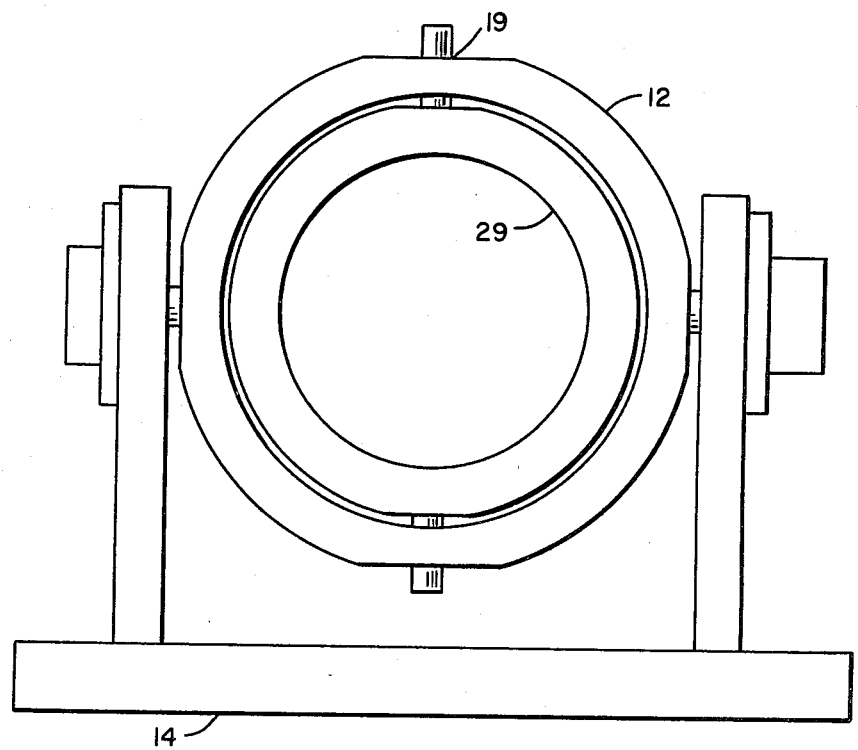
FIG. 1 is an elevational view of a stabilized gimbal assembly including the thin film plane-polarized intensity pickoff system of the present invention.
Figure 2:
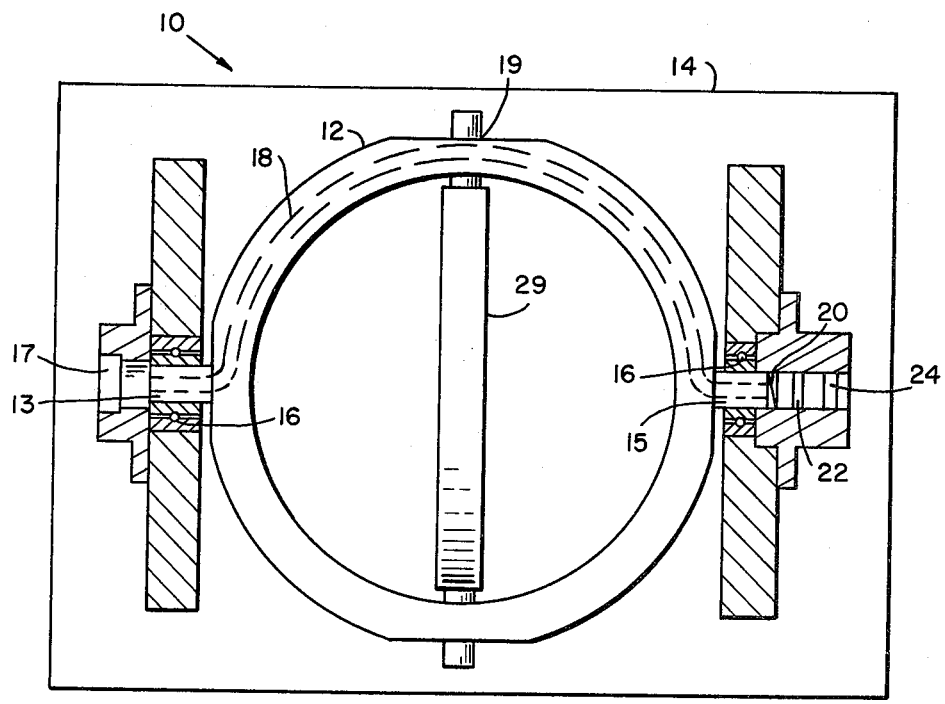
FIG. 2 is a plan view of the device of FIG. 1.

The wide-angle thin film plane polarized pickoff apparatus 10, FIGS. 1 and 2, includes a stabilized gimbal 12 which is decoupled from a housing 14 through shafts 13 and 15 and bearings 16. An electromagnetic unpolarized energy source 17 is secured to housing 14 adjacent the distal end of shaft 13. A fiber-optic path 18 is mounted on stabilized gimbal 12 and extends through shafts 13 and 15. A plane-polarizer 20 is attached to stabilized gimbal shaft 15. An analyzer 22 and an intensity energy sensor 24 are mounted on housing 14. An inner gimbal 29 is carried in the stabilized gimbal and decoupled therefrom by bearings 19.

Figure 3:
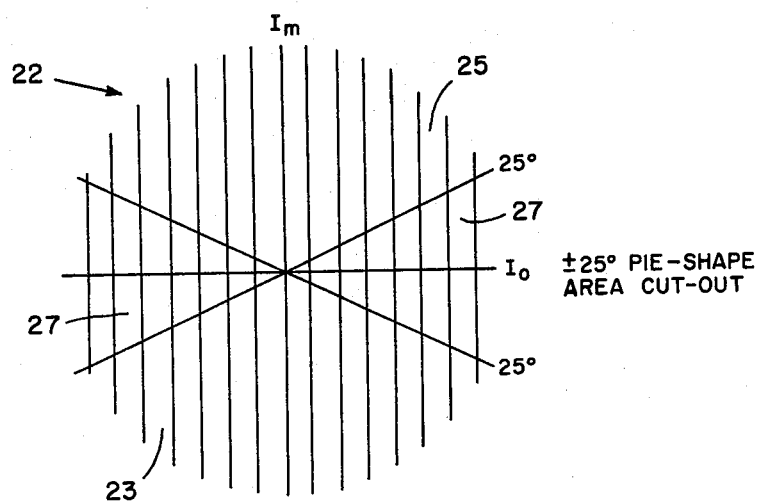
FIG. 3 is an elevational view of the analyzer of the present invention.
Figure 4:
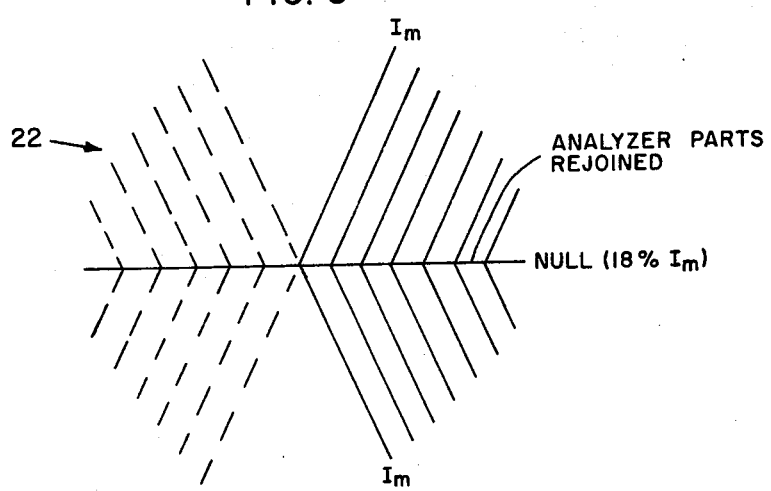
FIG. 4 is an elevational view of the analyzer of FIG. 3 having segments removed and parts rejoined to form a special analyzer for use in the structure of the present invention.
Figure 5:
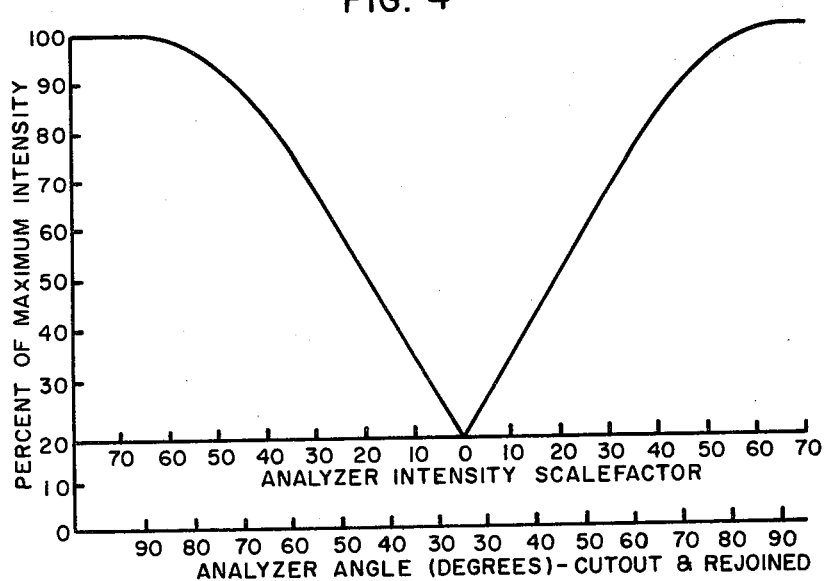
FIG. 5 is a view illustrating the analyzer intensity scale factor.

Gimbal 12 is stabilized and laser diode energy source 17 is activated simultaneously. The unpolarized energy is transmitted from source 17 through the fiber-optic path 18 to polarizer 20. The electromagnetic energy emerging from polarizer 20 is plane-polarized. The polarizing direction is established during the manufacturing process and assembly. Polarizer 20 will transmit only those wave-train components whose electric vectors vibrate parallel to this direction and will absorb those that vibrate at right angles to this direction. The intensity of the "P" plane-polarized energy transmitted through analyzer 22 varies according to Malus Law. That is, the maximum intensity occurs when the polarizing direction of polarizer 20 and analyzer 22 are parallel. If polarizer 20 is rotated relative to analyzer 22 about the direction of energy propagation, there are two positions at which the transmitted energy intensity is almost zero; these are the positions in which the polarizing directions of polarizer 20 and analyzer 22 are at right angles. Therefore, the intensity of the transmitted polarized energy from polarizer 20 through analyzer 22 varies with the angle of rotation according to $$I = I_m \cos^2 \theta,$$

in which $I_m$ is the maximum value of the transmitted intensity. To achieve a linear intensity scale factor range from null (almost zero intensity) to ±40 degrees, a special designed analyzer 22 is required as shown in FIG. 4. There exists in analyzer 22 a certain characteristic polarizing direction as shown by the parallel lines in FIG. 3. This polarizing direction is established during the manufacturing process by embedding long-chain molecules 25 in a flexible sheet 23 (FIG. 3) and then stretching the sheet so that the molecules are aligned parallel to each other. Plane-polarized energy falling on analyzer 22 will transmit only the parallel electric vector components. As seen in FIG. 4, analyzer 22 uses a concept that removes a ±25 degree pie-shape area 27 along the zero intensity axis. Analyzer 22 parts are then rejoined at the cut-out boundaries in FIG. 4. This design allows the null to occur at ±25 degrees from the right angle axis. In FIG. 3, the right angle axis is shown as the angle from maximum intensity ($1_m$) to minimum intensity ($1_o$). The transmitted energy intensity at null is now about 18 percent of the maximum intensity transmitted when polarizer 20 and analyzer 22 are parallel. FIG. 5 illustrates the predicted intensity scale factor covering a ±40 degree linear range from null and a ±65 degree non-linear range. Intensity sensor 24, such as a photocell, electrical output signal corresponds to the intensity of the energy transmitted by analyzer 22 which is a function of the analyzer angle relative to the stabilized polarizer 20. If more intensity is required a second analyzer portion (illustrated by the dashed lines in FIG. 4) may be resorted to; however, this is not necessary for the operation of the device, and is only necessary if more intensity is desired.

While the thin film plane-polarized intensity apparatus is described in conjunction with a stabilized gimbal assembly, such pick-off structure could be utilized in gyro structures of the type described in patent application entitled "Two-Degree-of-Freedom Gyro With Radiant Energy Pickoff", by Aubrey Rodgers, Ser. No. 201,678, filed Oct. 29, 1980. The caging, uncaging, spinup and sustain mechanisms have been omitted from the description of the present invention for the sake of clarity. However structure similar to that disclosed in the above said patent application may be resorted to, if desired.

I claim:

1. A thin film plane-polarized intensity pickoff assembly comprising:
   a. a housing;
   b. an outer stablized gimbal having a first pair of hollow shafts secured thereto and to said housing;
   c. an inner gimbal having a second pair of shafts secured thereto and to said outer gimbal;
   d. fiber optic means carried in the first of said hollow shafts, extending through said outer gimbal and into the second of said hollow shafts;
   e. light emitting means mounted on said housing adjacent said first hollow shaft for directing unpolarized radiant energy through said fiber optic means;
   f. polarizer means mounted on the end of the second of said hollow shafts for receiving said source of unpolarized radiant energy for polarization thereof;
   g. analyzer means for receiving and directing said polarized energy from said polarizer whereby the intensity of said polarized energy directed through said analyzer means varies with the angle of rotation of said hollow shafts; and
   h. detector means for receiving said polarized energy for said analyer.

2. Apparatus as in claim 1 wherein responsive to the relative rotation between said polarizer and said analyzer, the intensity of transmitted polarized energy from said polarizer through said analyzer varies with the angle of rotation according to:

$$I = I_m \cos^2 \theta,$$

wherein $I_m$ is the maximum value of the transmitted energy.

3. Apparatus as in claim 2 wherein said analyzer includes a maximum intensity axis and a zero intensity axis and a $\pm 25$ degree pie-shaped area removed along said zero intensity axis, the parts of said analyzer being rejoined at the cut-out boundaries, whereby a null occurs at $\pm 25$ degrees from the right angle axis, said right angle axis being defined as the angle from maximum intensity to minimum intensity.

* * * * *